United States Patent Office 3,479,361
Patented Nov. 18, 1969

3,479,361
1-TETRAHYDRONAPHTHYL- AND 1-INDANYL-
4-SUBSTITUTED PHENYL-4-CARBOXYALKYL
PIPERIDINES
Alex Meisels, Rolf Denss, and Hugo Ryf, Basel, Switzerland, assignors, by mesne assignments, to Geigy Chemical Corporation, Ardsley, N.Y., a corporation of Delaware
No Drawing. Continuation of application Ser. No. 304,656, Aug. 26, 1963. This application May 19, 1967, Ser. No. 639,912
Claims priority, application Switzerland, Mar. 30, 1962, 3,862/62
Int. Cl. C07d 29/24, 29/34; A61k 27/00
U.S. Cl. 260—293.4
17 Claims

ABSTRACT OF THE DISCLOSURE

The compounds are of the class of 1-tetrahydronaphthyl- or 1-indanyl-4-aryl-4-carboxyalkyl piperidine derivatives which are useful as analgetics or antitussives. Illustrative compounds are 1-[1'-methyl-1-1',2',3',4'-tetrahydronaphthyl-(2')]-4-phenyl-4-carbethoxy - piperidine and 1-[1'-ethoxyindanyl-(2')] - 4 - phenyl-4-carbethoxypiperidine.

---

This application is a continuation of our application Ser. No. 304,656 filed on Aug. 26, 1963, which is a continuation-in-part of our application Ser. No. 267,814, filed on Mar. 25, 1963, both now abandoned.

This invention relates to new piperidine derivatives which possess valuable pharmacological properties.

It is one object of the present invention to provide new piperidine derivatives which possess improved analgetic activity combined with a low depressive action on the central nervous system.

It is another object of the present invention to provide new piperidine derivatives which are characterized by antitussive activity, accompanied by low analgetic and consequently no habit-forming properties and are, therefore, useful as the active ingredient in antitussive medicaments.

It is known that there are 4-aryl-4-carboxyalkyl-substituted piperidine derivatives which possess an analgetic activity which depends largely on the nature of substituents present at the nitrogen atom of the piperidine nucleus. Especially those derivatives which are substituted at the aforesaid nitrogen atom with a methyl group or with an aliphatic chain which bears in turn, at a distance of at least two carbon atoms from the aforesaid nitrogen atom, an aromatic mononuclear carbocyclic radical, are distinguished by very good analgetic properties which have rendered them useful in therapeutic preparations. On the other hand, piperidine derivatives which are substituted at the aforesaid nitrogen atom with an aliphatic chain bearing a monocyclic aromatic radical at a distance of only one, or more than four carbon atoms from the said nitrogen atom, are useful as analgetics.

It has now been found that, contrary to expectation, substitution of the nitrogen atom of the piperidine nucleus in the above-mentioned class of 4-aryl-4-carboxyalkyl-substituted piperidines with bicyclic hydroaromatic radicals which are directly linked, via their hydrogenated ring portion, to the nitrogen atom of the piperidine nucleus leads to compounds which show, on the one hand, excellent analgetic, and on the other hand, antitussive effects.

The above listed and other objects which will become apparent from the following description of the invention, are attained especially in the novel compounds described hereinafter.

According to a first aspect of this invention, the novel compounds of the formulas

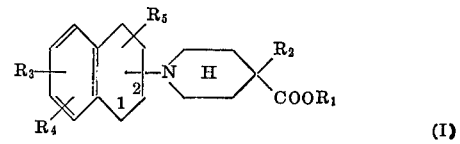

(I)

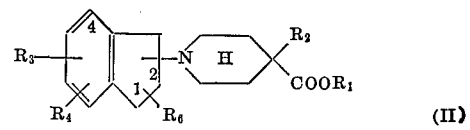

(II)

wherein, as well as in all following formulas, like symbols have like meanings, namely:

$R_1$ represents lower alkyl, $R_2$ represents phenyl, lower alkylphenyl, or lower alkoxyphenyl, or in another group of derivatives, chlorophenyl or bromophenyl, $R_3$ represents hydrogen, hydroxy-lower alkyl, lower alkoxy, lower alkanoyloxy, amino, lower alkylamino, namely mono-lower alkylamino as well as di-lower alkylamino, lower alkanoylamino or nitro, and, in a further group of derivatives, chloro, bromo, or fluoro, $R_4$ represents either hydrogen or lower alkyl, $R_5$ represents hydrogen, hydroxy, oxo, lower alkyl, lower alkoxy, lower alkanoyloxy, and $R_6$ represents lower alkoxy, are particularly useful as analgetics on account of their strong analgetic properties, while, for this very reason, they are not recommended for use in antitussive medicaments even in those cases where they possess good antitussive activity, except when simultaneously antitussive and analgetic action is required.

Among the above group of compounds according to the invention, particularly good analgetic activity is shown by those of the formulas

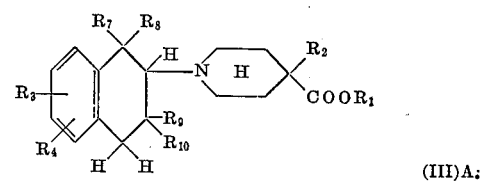

(III)A;

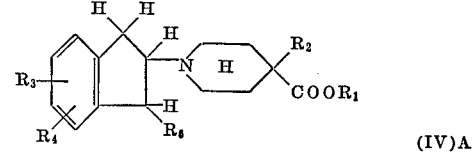

(IV)A

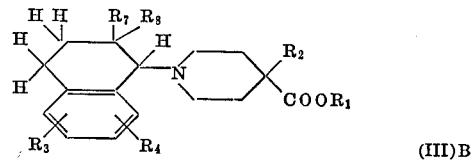

(III)B

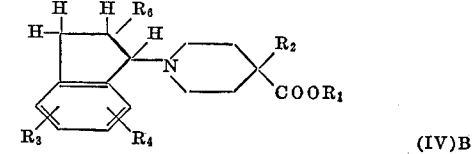

(IV)B wherein $R_1$, $R_2$, $R_3$, $R_4$ and $R_6$ have the afore-mentioned meanings, each of $R_7$ and $R_9$ represents, independently, hydrogen, hydroxy, lower alkyl, lower alkoxy or lower alkanyloxy, $R_8$ represents either hydrogen, or together with $R_7$ the oxo radical, $R_{10}$ represents either hydrogen, or together with $R_9$ the oxo radical, and at least one of the pairs $R_7$, $R_8$, and $R_9$, and $R_{10}$ represents hydrogen atoms (Formula III A).

According to another aspect of the invention, the novel compounds of the formula

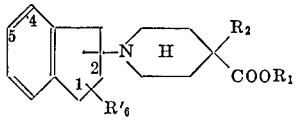

(VI)

and more particularly those of the formulas

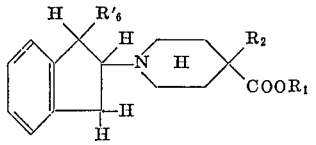

(VII)A and

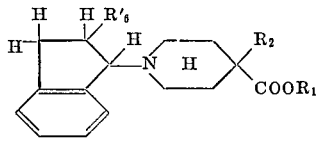

(VII)B wherein $R'_6$ is hydrogen, hydroxy, lower alkyl, or lower alkanoyloxy and $R_1$ and $R_2$ have the meanings given above, have strong antitussive activity while the analgetic component in their pharmacodynamic spectrum is sufficiently weaker than that of the compound of Formulas I and II, so that they are very well suited for use as active ingredients in antitussive medicines.

The novel compounds of the formulas

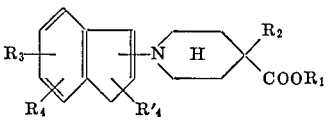

(VIII)

and

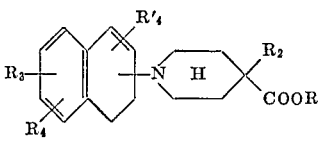

(IX)

wherein $R_1$, $R_2$, $R_3$ and $R_4$ have the above given meanings and $R'_4$ represents hydrogen or lower alkyl, as well as the compounds of Formula I supra which contain a halogen, preferably a chlorine or bromine atom in lieu of $R_5$, are suitable as intermediates in the production of the active components described hereinbefore, by methods to be described further below.

The pharmacodynamic spectra of the compounds of Formulas I to VII (A and B) comprise analgetic, antitussive, spasmolytic, anesthetics-potentiating and only weak sedative components which render these compounds useful as the active ingredients in pharmaceutical preparations for the above-mentioned purposes.

Analgetic preparations containing the above analgetically active substances as active ingredients, are distinguished by low centrally depressory side effects. Those bearing a hydroxyl or lower alkyl group at the hydrogenated ring portion of the bicyclic nucleus in α-position to the nitrogen atom of the piperidine nucleus, are particularly spasmolytically active.

In all definitions where "lower" is used herein as well as in the appended claims, in connection with "alkyl" and the like aliphatic radicals, radicals with a total of from one to four carbon atoms are meant.

The compounds according to the invention, represented by Formulas I to VII (A and B) inclusive can be administered as such or in the form of their pharmaceutically acceptable, non-toxic salts, perorally or rectally and, in the form of aqueous solutions of their salts, also parenterally.

Acids suitable for salt formation are, e.g. hydrochloric acid, hydrobromic acid, sulfuric acid, phosphoric acid, methane sulfonic acid, ethane sulfonic acid, ethane disulfonic acid, β-hydroxyethane sulfonic acid, acetic acid, lactic acid, oxalic acid, succinic acid, maleic acid, fumaric acid, malic acid, tartaric acid, citric acid, benzoic acid, salicylic acid, phenylacetic acid, and mandelic acid.

Pharmaceutically acceptable salts, i.e. salts with pharmaceutically acceptable acids which, in the necessary dosages are pharmacologically harmless, can be used as active substances for oral or parenteral administration. Salts with other acids are suitable, for example, for recrystallization in order to purify the new compounds.

The above-described compounds of Formulas I to IX according to the invention are produced by a process which leads to the production of compounds of the general formula

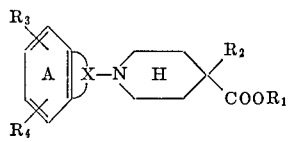

(X)

which comprises the aforesaid compounds of Formula I to IX inclusive and wherein $R_1$, $R_2$, $R_3$ and $R_4$ have the above-given meanings, and X represents a straight-chain, saturated or mono-unsaturated trivalent aliphatic hydrocarbon radical having 3 to 5 carbon atoms, two free terminal linkages of which, at different carbon atoms, are bound to the benzene nucleus A and which can be substituted by an oxo radical, a hydroxyl group, a lower alkoxy or a lower alkanoyloxy radical, and/or by maximally two lower alkyl radicals, or, in the case of intermediates, by a chlorine atom, and which process comprises (a) reacting a compound of the general formula

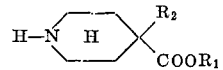

(XI)

wherein $R_1$ and $R_2$ have the above-given meanings, if necessary, in the presence of an acid binding agent, and preferably in an organic inert solvent medium, such as anhydrous ethanol, butanol, isopropanol, benzene or toluene, at elevated temperature, preferably at the boiling temperature of the solvent mixture, with a reactive ester of an alcohol of the general formula

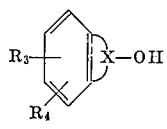

(XII)

wherein $R_3$, $R_4$ and X have the above-given meanings and an acid, described more in detail below, and then recovering the resulting products of Formula X by conventional methods.

If necessary, acid-binding agents such as sodium or potassium carbonate or tertiary organic bases, in particular lower trialkylamines, di-lower alkyl-phenyl-amines, or pyridines such as, for example, triethylamine, tri-n-butylamine, N,N-dimethyl-aniline or pyridine are added to the reaction mixture.

In the starting compound of Formula XI, $R_1$ can be, for example, a methyl, ethyl, n-propyl, isopropyl, n-butyl or isobutyl radical, and $R_2$ can be, for example, phenyl, methylphenyl, ethylphenyl, isopropylphenyl, methoxyphenyl, ethoxyphenyl, n-propoxyphenyl, isopropoxyphenyl, n-butoxyphenyl, isobutoxyphenyl or chlorophenyl.

Reactive esters of alcohols of the general Formula XII are, in particular, hydrohalic acid esters, i.e. bromides and chlorides as well as lower alkane and lower alkylphenyl sulfonic acid esters such as p-toluene sulfonic acid ester and methane sulfonic acid ester. The reactive esters can also be derived from enols, i.e. the halogen atom or sulfonyloxy group taking part in the reaction may be at a carbon atom which is linked by a double bond to a neighbouring C-atom of ring-part X.

In addition to any bromine or chlorine atom present as reactive ester component, there can also be a chlorine atom present in X which, because of its position in the molecule, is less reactive and remains as a substituent of the radical X in the final product of Formula X.

Independently of each other $R_3$ and $R_4$ are, in Formula XII above, e.g. hydrogen, methyl, ethyl, n-propyl, isopropyl, tert. butyl, methoxy, ethoxy, n-propoxy, isopropoxy, n-butoxy or isobutoxy radicals. In addition $R_3$ can be, e.g. the acetoxy, propionoxy, or butyroxy radical, a hydroxyl group, a chlorine, bromine or fluorine atom or the amino, formylamino, acetylamino, propionylamino or butyrylamino group. The trivalant radical X is, e.g. a 1-propanyl-3-ylidene or 1,2,3-propantriyl radical, a 1-butanyl-4-ylidene or 1,2,4-butantriyl radical, a 1-pentanyl-5-ylidene, 1,2,5-pentantriyl or 1,3,5-pentantriyl radical, a 1-propene-1-yl-3-ylidene, 2-propene-1-yl-3-ylidene, 2-butene-1-yl-4-ylidene, 3-butene-1-yl-4-ylidene, 1-butene-1,2,4-triyl, 1-butene-1,3,4-triyl or 2-butene-1,2,4-triyl radical, a 4-pentene-1-yl-5-ylidene or 2-pentene-1,2,5-triyl radical.

These trivalent radicals can be substituted, e.g. by one to two low alkyl radicals having together at most 7 carbon atoms whereby they are transformed into branched chained aliphatic hydrocarbon radicals having in all at most 12 carbon atoms. Examples of lower alkyl radicals are in particular methyl, ethyl, n-propyl, isopropyl, n-butyl, isobutyl, and tert. butyl radicals. Another substituent of trivalent radical X, in particular at a methylene group which may be alkyl substituted, can be a hydroxyl group, a methoxy, ethoxy, n-propoxy, isopropoxy, n-butoxy, acetoxy, propionoxy or butyroxy radical or at an unsubstituted methylene group only an oxo radical.

Various starting materials of the general Formula XI and numerous reactive esters of compounds of the general Formula XII are known and others can be produced in an analogous manner. Examples of reactive esters of compounds of the general Formula XII are, for instance: 1-chloroindane, 1-bromoindane, 1-hydroxy-2-bromoindane, 1-methoxy-2-bromoindane, 1-ethoxy-2-bromoindane, 1-propoxy-2-bromoindane, 2-bromoindanone-(1), 3-bromoindanone-(1), 1-chlorotetralin, 2-chlorotetralin, 1-bromoindene, 1-bromotetralin, 2-bromotetralin, 1-hydroxy-2-bromotetralin, 1-methoxy-2-bromotetralin, 1-ethoxy-2-bromotetralin, 1-n-propoxy-2-bromotetralin, 2-bromotetralone-(1), 5-chloro-6,7,8,9-tetrahydro-5H-benzocyclo-heptene, 7-bromo-6,7,8,9-tetrahydro-5H-benzocycloheptene and 7-(p-toluenesulfonyloxy)-6,7,8,9-tetrahydro-5H-benzocycloheptene.

A group of compounds of the general Formula X which is characterized by Formula XIV, infra, is obtained by a second process which comprises reacting a compound of the general Formula XI given above wherein $R_1$ and $R_2$ have the meanings there given with a compound of the general formula

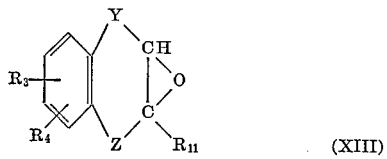

(XIII)

wherein $R_{11}$ represents hydrogen or a lower alkyl radical and

Y and Z represent alkylidene or alkylene radicals which complete the 1-hydroxy-1-ethanyl-2-ylidene radical in the Formula XIV given below to a hydroxyl-substituted radical corresponding to the definition of X, given supra, and one of the two symbols Y and Z, can also represent the direct bond, and wherein $R_3$ and $R_4$ have the meanings given hereinbefore, the reaction being carried out preferably at elevated temperature, with best results at a temperature in the range of about 50° to 150° C., and, if necessary, in the presence of an inert aromatic hydrocarbon solvent such as benzene, toluene or xylene, whereby a compound of the general formula

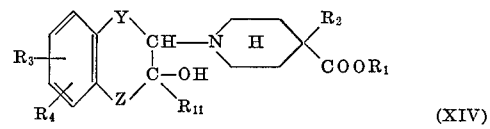

(XIV)

is obtained. In this formula, which is comprised by Formula X above, $R_1$, $R_2$, $R_3$, $R_4$, $R_{11}$, Y and Z have the above-stated meanings.

Examples of starting materials of the general Formula XIII are, for instance: 1,2-epoxyindane, 2,3-epoxytetralin, 2,3-epoxy-5-methyltetralin, 1,4-diethyl-2,3-epoxytetralin and 5,6-epoxy-6,7,8,9-tetra-hydro-5H-benzocycloheptene. In these compounds, Y is the methylene or trimethylene radical and Z is the direct bond or the methylene radical.

A third process for the production of compounds of Formula X, namely those resulting from the starting compound of Formula XV, comprises (a) reacting a compound of the general Formula XI given above wherein $R_1$ and $R_2$ have the meanings there given at elevated temperature e.g. in suitable inert organic, preferably aromatic hydrocarbon solvents such as benzene, toluene or xylene or without such solvent the water formed in the reaction being continuously distilled off, and advantageously with the exclusion of oxygen, e.g. in an atmosphere of nitrogen, with the above-mentioned compound of formula

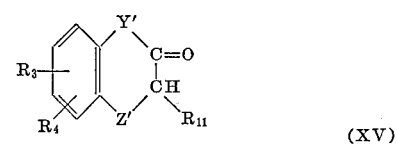

(XV)

wherein Y' and Z' represents alkylidene or alkylene radicals which complete the 1-ethenyl-2-ylidene radical or a 1-lower alkyl-1-ethenyl-2-ylidene radical contained in the general Formula XVI infra to a radical corresponding to the definition of X supra, wherein one of X' and Z' can also be the direct carbon-to-carbon bond, and $R_3$, $R_4$ and $R_{11}$ have the meanings given above, and if desired, (b) reacting the resulting product of the general formula

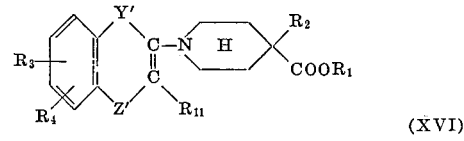

(XVI)

in those cases in which $R_{11}$ in the latter is hydrogen, with a reactive ester of methanol, preferably a methyl halide, in particular methyl iodide, in a suitable inert organic solvent, preferably such as dioxan, performing the reaction at elevated temperature, preferably at about 30° to 60° C., and, if necessary, in a closed vessel, thereby obtaining the corresponding methyl-substituted immonium salt, in particular an immonium halide such as the iodide, and finally, if desired, (c) reducing or hydrogenating the semicylic double bond of the said methyl-substituted immonium salt, or, if so desired, reducing or hydrogenating the reaction product of Formula XVI, supra, directly. The reduction under step (c) can be carried out in the cold, or, if necessary, with heating, e.g. with the aid of sodium boronhydride or potassium boronhydride as hydrogenating agent in an organic medium, such as methanol, ethanol, isopropanol, diethyleneglycol, dimethylether, in which, preferably, both the compound to be reduced as well as the alkali metal boronhydride are at least partially soluble. Also boiling in anhydrous formic acid is a suitable method for reducing enamines of the general Formula XVI.

Numerous starting materials of the general Formula XV are known and others can be produced analogously. The following compounds are given as examples of such starting materials: indanone-(1), 3-methylindanone-(1), 4-bromo-7-methylindanone-(1), indanone-(2), 1-methylindanone-(2), 1-ethylindanone-(2), 1-n-propylindanone-(2), tetralone-(1), 2-methyltetralone-(1), 7-methyltetralone-(1), 7-isopropyltetralone-(1), 2,3,-dimethyltetralone-(1), 2,5, dimethyltetralone-(1), 4,7-dimethyltetralone-(1), 5,7-dimethyltetralone-(1), 6,7-dimethyltetralone-(1), 2,-4,7-trimethyltetralone-(1), 5-methoxytetralone-(1), 7-chlorotetralone-(1), 6-acetylaminotetralone-(1), 6-ethoxycarbonylaminotetralone-(1), tetralone-(2), 1-methyltetralone-(2), 1-ethyltetralone-(2), 1-n-propyltetralone-(2), 6-methoxytetralone-(2), 6,7,8,9-tetrahydro-5H-benzocycloheptenone-(5), 3-methoxy-6,7,8,9-tetrahydro-5H-benzocycloheptenone-(6), 6,7,8,9-tetrahydro-5H-benzocycloheptenone-(7), and 6-methyl-6,7,8,9,-tetrahydro-5H-benzocycloheptenone-(7).

Representatives of the symbols Y' and Z' in general Formulas XV and XVI are the same radicals as given for Y and Z, for example Y' is the direct linkage, a methylene, ethylene or propylene radical and Z' is the direct linkage, a methylene, ethylidene, ethylene, propylene or trimethylene radical.

Subsequent conversions can be made at the end of each of the above-described three production processes, and are of importance, for example because the second process which is valuable due to the starting materials being readily accessible and very reactive only leads, directly, to reaction products having a hydroxyl group as substituent of X, and because there are great differences with regard to accessibility of the starting materials for the first process, which differences permit the subsequent introduction of a substituent, in some cases, to be performed more advantageously by modification of an intermediary substituent, rather than by introduction of such substituent directly into the starting material. Depending on the process employed and on the starting materials, both the etherification or acylation of hydroxyl groups as well as the liberation thereof from acyloxy groups, as well as the reduction of oxo radicals to hydroxyl groups and, invertedly, the oxidation of hydroxyl groups to oxo radicals, the acylation of amino groups as well as the liberation thereof from acylamino groups, can be of advantage. In the same way, the splitting off of hydrogen halide or water both for the purpose of production of an unsaturated compound of general Formula X as well as a mere intermediate step in the elimination of an original hydroxyl group, followed by a hydrogenation, can be performed The modifications of primary reaction products illustrated below can also be made to the products of the third process mentioned.

If desired, a primary reaction product having a hydroxyl group or groups as $R_3$ and/or in X is etherified to a compound of general Formula X having one or two low alkoxy groups in the corresponding positions. The etherification is performed, e.g. by reacting corresponding primary reaction products with reactive esters of lower alkanols, in particular with lower alkyl halides, dialkyl sulfates or aryl sulfonic acid alkyl esters, in the presence of acid binding agents. Alkali metals and derivatives thereof such as sodium amide or sodium hydride for example can serve as such agents, by means of which the primary reaction products containing hydroxyl groups can be converted into their alkali metal compounds, advantageously immediately before the second reaction.

In addition, the etherification can also be performed, for example, by means of diazomethane and boronfluoride/ether complex or ether/methylene chloride, or by means of lower alkanols in the presence of agents which split off water such as, e.g. sulfuric acid or p-toluene sulfonic acid.

Also, a primary reaction product having a hydroxyl group or groups as $R_3$ and/or in X can be acylated to a compound of the general Formula X having one or two lower alkanoyloxy groups in the corresponding positions. The acylation is performed, e.g. by reacting in pyridine, halides or anhydrides of lower alkanoic acids, e.g. acetic acid, propionic acid, butyric acid or isobutyric acid, with the primary reaction products, or with sodium compounds of the primary reaction products in inert organic solvents. It can also be performed, e.g. by reacting lower alkanoic acids with the primary reaction products in the presence of agents splitting off water.

In reverse, if desired, a primary reaction product having an alkanoyloxy group or groups as $R_3$ and/or as substituent in X is hydrolyzed into a compound of general Formula X having one or two hydroxyl groups in the corresponding positions. The hydrolysis can be performed, e.g. by means of alkanolic alkali metal hydroxide solutions under mild reaction conditions without the radical $R_1$ being split off. The alkali metal hydroxide solution is used in the stoichiometric ratio corresponding to the number of low alkanoyl radicals to be split off. Also acid hydrolysis can be used, e.g. by means of aqueous or aqueous/alkanolic hydrochloric acid, or, when suitable reaction conditions are chosen, an alkanoyloxy group can be split during the primary reaction. The use of starting materials which lead to primary reaction products having one or two alkanoyloxy groups instead of the desired hydroxyl groups in the end products, can be of interest for various reasons. For example, in a suitable hydroxy-oxo compound, first the hydroxyl group can be acylated, then the oxo radical reduced and the alkanoyloxy-hydroxy compound of the general Formula XII obtained can be converted into a reactive ester; or it can be of advantage in the production of epoxides of general Formula XIII by oxidation of corresponding unsaturated compounds, to protect a hydroxy group $R_3$ by alkanoylation.

Another possibility for the introduction of a free hydroxyl group into the radical X of a primary reaction product of general Formula X consists in reducing or hydrogenating such a product containing an oxo radical in X to form a compound of the general Formula X having a hydroxyl group in the corresponding position. The reduction can be performed in the cold or, if necessary, in the warm, by means of, e.g. sodium or potassium boronhydride in a suitable organic or organic/aqueous medium such as e.g. diethylene glycol dimethyl ether. The hydrogenation can be performed, e.g. in the presence of Raney nickel or noble metal catalysts such as palladium or charcoal or barium carbonate, in an organic solvent such as dioxan or ethanol. The value of this process lies in the fact, for example, that various α-halogen ketones are available as easily accessible reactive esters of compounds of the general Formula XII, in which compounds the oxo radical could not have been or only could have been reduced or hydrogenated with much more difficulty before the reaction with a compound of general Formula XI.

On the other hand, particularly in the second process mentioned, primary reaction products having a hydroxyl group in X are obtained in a simple manner. These reaction products are converted, if desired, into compounds of the general Formula X having an oxo radical in the corresponding position by treating them with an oxidizing agent, for example with chromium trioxide in glacial acetic acid at room temperature or in pyridine in the warm.

Whilst the above is concerned with conversions of the hydroxyl group with preservation of the oxygen atom of the latter group, there are also further conversions involving the elimination of said oxygen atom. The reason therefor is again the simple production of certain primary reaction products having a hydroxyl group as substituent of X, here in comparison to, for example, desired end products having a halogen-substituted or unsaturated radical X.

Thus, if desired, a compound of general Formula X having a hydroxyl group in X, which itself can be a primary reaction product or which can be obtained by one of the conversions previously mentioned, or an alkali metal compound thereof, is converted into a compound of general Formula X having a chlorine atom in the corresponding position by treatment with a sulfonic acid chloride, in particular methane sulfonic acid chloride, or with an inorganic acid chloride such as thionyl chloride, or also with phosgene or oxalyl chloride, in a suitable inert organic solvent such as, e.g. benzene.

In addition, if desired, the compound of general Formula X obtained as above having a chlorine atom in X is converted into a compound of Formula X having a double bond in X by treatment at elevated temperature with an inorganic or organic base, e.g. with a sodium alkanolate in the corresponding alkanol, or with collidine, or a compound of general Formula X having a hydroxyl group in X is converted into the compound of Formula X having a double bond in X by splitting off water. The water is split off, e.g. by treatment with suitable agents such as phosphorus pentoxide or potassium bisulfate at raised temperature or, particularly when the hydroxyl group is bound to a tertiary carbon atom, by simple heating, e.g. distillation under reduced pressure.

The compounds of general Formula X having a double bond in X obtained as described above or, in certain cases, as primary reaction products, are hydrogenated, if desired, to the corresponding compounds without a double bond in X, e.g. in the presence of Raney nickel or a noble metal catalyst, in a suitable organic solvent such as dioxan or ethanol. Starting from a primary reaction product having a hydroxyl group or an oxo radical in X, the above reactions together form a suitable series for the elimination of a hydroxyl group or an oxo radical and make it possible, for example, to attain compounds having an unsubstituted radical X by the second production process.

Compounds of general Formula X having a free amino group $R_3$ are produced by hydrolyzing a primary reaction product of general Formula X with a lower alkanoyl-amino group $R_3$, for example by means of moderately concentrated hydrochloric acid or by means of alkanolic or aqueous/alkanolic alkali lye. Also, with a suitable choice of reaction conditions, a low alkanoylamino group $R_3$ can be split off during the primary reaction.

Invertedly, a primary reaction product of the general Formula X having an amino group $R_3$ can be acylated to a corresponding compound having a low alkanoylamino group $R_3$, for example by treatment with a low alkanoic acid halide or anhydride, if necessary in the presence of an acid binding agent such as, e.g. pyridine, or by treatment with an alkali carbonate in an organic solvent or with sodium hydroxide solution in a two-phase organic/aqueous system. The acetyl radical is most simply introduced, e.g. by boiling a primary reaction product having a free amino group in excess acetic anhydride.

The compounds of general Formula X are converted in the conventional manner into their salts with inorganic or organic acids.

EXAMPLE 1

(a) 14.5 g. of 4-phenyl-4-carboethoxy-piperidine carbonate (4-phenyl-isonipecotinic acid ethyl ester carbonate, produced according to Thorp and Walton, J. Chem. Soc. 1948, 559) in 25 ml. of anhydrous butanol are refluxed for 1 hour. A solution of 11.4 g. of 1-hydroxy-2-bromotetralin (produced according to Straus and Rohrbacher, Ber. 54, 40 (1921)) in 50 ml. of anhydrous butanol is then slowly added dropwise and the mixture is refluxed for another 14 hours. The butanol is distilled off in vacuo and the oily residue is dissolved in ether and 1 N hydrochloric acid and extracted several times with 100 ml. of N hydrochloric acid. The combined acid solutions are then made alkaline with 1 N sodium hydroxide solution and extracted twice with ether. To separate from non-reacted 4-phenyl-4-carboethoxy-piperidine, solid carbon dioxide is added to the ether extract whereupon the starting material mentioned precipitates in the form of the carbonate and can be filtered off. The 1-[2'-hydroxy-1',2',3',4' - tetrahydronaphthyl - (1')] - 4 - phenyl-4-carboethoxy-piperidine formed by rearrangement and obtained by distilling off the solvent from the ethereal filtrate, is not crystalline and is purified, therefore, by way of the hydrochloride. To obtain the hydrochloride, 10 g. of the crude base are dissolved in 50 ml. of abs. ether and the calculated amount of cold saturated ethereal hydrochloric acid is added while cooling with ice. The hydrochloride obtained melts after recrystallisation from methanol/ether at 192–193°. Hydrobromide, M.P. 112–115°. Maleate, M.P. 137–138°.

(b) To produce 1-[2'-acetoxy - 1',2',3',4' - tetrahydronaphthyl-(1')]-4-phenyl-4-carboethoxy-piperidine, 3.2 g. of the above hydroxy base in 10 ml. of abs. pyridine and 10 ml. of acetanhydride are left to stand for 14 hours at room temperature. After distilling off the reactants in vacuo, the crude product which remains is dissolved in 500 ml. of ether and washed several times with 10% sodium carbonate solution and water. It is recrystallised from ether/pentane and then melts at 107–108°. Hydrochloride M.P. 193–194°.

(c) To produce 1-[2' - propionoxy-1',2',3',4'-tetrahydronaphthyl-(1')]-4-phenyl - 4 - carboethoxy-piperidine, 2.9 g. of the above hydroxy base are dissolved in 10 ml. of abs. pyridine, 1.5 ml. of propionyl chloride are added while cooling and the reaction mixture is left to stand for 14 hours at room temperature. It is then dissolved in 500 ml. of ether and washed several times with 5% sodium bicarbonate solution and water. The ether is distilled off, the residue is dissolved in a mixture of benzene and hexane (5:2) and filtered according to Brockmann through 25 times the amount of aluminium oxide, activity II. After distilling off the solvent, the product which remains is recrystallised from ether/pentane and then melts at 104–105°. Maleate M.P. 76–86°.

EXAMPLE 2

1-[1'-methoxy - 1',2',3',4' - tetrahydronaphthyl-(2')]-4-phenyl-4-carboethoxy-piperidine is produced analogously to Example 1a starting from 14.5 g. of 4-phenyl-4-carboethoxy-piperidine carbonate and 12.5 g. of 1-methoxy-2-bromotetralin (which latter is produced according to Straus and Rohrbacher Ber. 54, 40 (1921)). It melts at 63–65°. Hydrobromide, M.P. 191–192°.

EXAMPLE 3

1 - [1'ethoxy - 1',2',3',4' - tetrahydronaphthyl - (2')]-4-phenyl-4-carboethoxy-piperidine is obtained analogously to Example 1a starting from 14.5 g. of 4-phenyl-4-carboethoxypiperidine carbonate and 12.8 g. of 1-ethoxy-2-bromotetralin (which latter is produced analogously to the methoxy compound, see Example 2). M.P. 82–83°. Hydrochloride, M.P. 199–200°.

EXAMPLE 4

1 - [1' - n - propoxy - 1',2',3',4' - tetrahydronaphthyl-(2')] - 4 - phenyl - 4 - carboethoxy - piperidine is obtained analogously to Example 1a starting from 14.5 g. of 4-phenyl-4-carboethoxy-piperidine carbonate and 13.5 g. of 1 n-propoxy-2-bromotetralin (which latter is pro-

EXAMPLE 5

(a) 1 - [2' - hydroxy - indanyl - (1')] - 4 - phenyl - 4-phenyl-4-carboethoxy-piperidine is obtained analogously to Example 1a starting from 14.5 g. of 4-phenyl-4-carboethoxy-piperidine carbonate and 10.7 g. of 1-hydroxy-2-bromoindane (which latter is produced according to Treibs and Schroth, Ann. 639, 204 (1961)). It melts at 114–115°. Hydrochloride 186–187°.

(b) 1 - [2' - acetoxy - indanyl - (1')] - 4 - phenyl - 4-carboethoxy-piperidine is obtained analogously to Example 1b starting from 5 g. of the above hydroxy base and a mixture of 10 ml. of abs. pyridine and 10 ml. of acetanhydride. M.P. 100–102°. Hydrochloride, M.P. 139–141°.

(c) 1 - [2' - propionoxy - indanyl - (1')] - 4 - phenyl-4-carboethoxy-piperidine is obtained analogously to Example 1c starting from 9.1 g. of the above hydroxy base and 2.5 ml. of propionyl chloride. M.P. 67–68°. Hydrochloride M.P. 122–125°.

EXAMPLE 6

1 - [1' - Methoxy - indanyl - (2')] - 4 - phenyl - 4 - carboethoxy-piperidine is obtained analogously to Example 1a starting from 18.5 g. of 4-phenyl-4-carboethoxy-piperidine carbonate and 16 g. of 1-methoxy-2-bromoindane (which latter is produced analogously to 1-methoxy-2-bromotetralin, see Example 2). It melts at 73–74°, hydrobromide M.P. 206–207°.

EXAMPLE 7

1 - [1' - ethoxy - indanyl - (2')] - 4 - phenyl - 4 - carboethoxy - piperidine is obtained analogously to Example 1a starting from 18.5 g. of 4-phenyl-4-carboethoxy-piperidine carbonate and 16.8 g. of 1-ethoxy-2-bromoindane (which latter is produced analogously to 1-methoxy-2-bromotetralin, see Example 2). It melts at 98–99°, hydrochloride M.P. 215–216°.

EXAMPLE 8

1 - [1' - n - propoxy - indanyl - (2')] - 4 - phenyl - 4-carboethoxy-piperidine is obtained analogously to Example 1a starting from 35.3 g. of 4-phenyl-4-carboethoxy-piperidine carbonate and 17.1 g. of 1-n-propoxy-2-bromoindane (which latter is produced analogously to the methoxy compound, see Example 2). It boils at 188–189° under 0.006 mm. Hydrobromide, M.P. 225–226°.

EXAMPLE 9

1 - [1',2',3',4' - tetrahydronaphthyl - (2')] - 4 - phenyl-4-carboethoxy-piperidine is produced analogously to Example 1a. 30 g. of 4-phenyl-4-carboethoxy-piperidine carbonate are used as starting material but before the addition of 12.5 g. of 2-chlorotetralin (produced according to Richtzenhain, Chem. Ber. 81, 96 (1948)), all the solvent is distilled off in vacuo and then the mixture is heated at 100° for 24 hours. M.P. of the base 97–98°; of the hydrochloride 199–200°; of the methane sulphonate 194–196°. Compare Examples 17 and 30.

EXAMPLE 10

1 - [1' - oxo - 1',2',3',4' - tetrahydronaphthyl - (2')]-4-phenyl-4-carboethoxy-piperidine is obtained analogously to Example 1a, 22.5 g. of 4-phenyl-4-carboethoxy-piperidine carbonate and 9.5 g. of 2-bromotetralone-(1) (produced according to Straus et al., Ann. 444, 178 (1925)) being used as starting material and 200 ml. of benzene being used as solvent. Hydrochloride M.P. 206–211°.

EXAMPLE 11

1 - (1' - indanyl) - 4 - phenyl - 4 - carboethoxy - piperidine is produced analogously to Example 1a) starting from 21.1 g. of 4-phenyl-4-carboethoxy-piperidine carbonate and 6.1 g. of 1-chloroindane (produced according to Weissgerber, Ber. 44, 1442 (1912)), on using 200 ml. benzene as solvent M.P. 94–95°. Hydrochloride M.P. 167–169°.

EXAMPLE 12

(a) 1 - (6',7',8',9' - tetrahydro - 5'H - benzocycloheptene - 7' - yl) - 4 - phenyl - 4 - carboethoxy - piperidine is obtained analogously to Example 1a starting from 15.8 g. of 4-phenyl-4-carboethoxy-piperidine carbonate and 13.4 g. of 7-bromo-6,7,8,9-tetrahydro-5H-benzocycloheptene (for production thereof see below) with the addition of 24 g. of anhydrous sodium carbonate and using 200 ml. of ethylene glycol monoethyl ether as solvent. M.P. 87–880. Methane sulphonate, M.P. 205–206°.

In addition to the 1-(6',7',8',9'-tetrahydro-5'H-benzocycloheptene - 7' - yl) - 4 - phenyl - 4 - carboethoxy-piperidine, also a slight amount of 1-(6',7',8',9'-tetrahydro-5'-H-benzocycloheptene - 6' - yl) - 4 - phenyl - 4 - carboethoxy-piperidine, (M.P. 84–87°) is obtained. Sulphate M.P. 243–244°.

To separate the two isomers, the mixture which precipitates is dissolved in hexane and filtered according to Brockmann through 25 times the amount of aluminium oxide activity II. The isomer having the piperidine ring in the 6'-position is eluted in the first hexane fractions whilst that having the piperidine ring in the 7'-position is contained in the later fractions.

Preparation of 7-bromo-6,7,8,9-tetrahydro-5H-benzocycloheptene: 16 g. of 6,7,8,9-tetrahydro-5H-benzocycloheptene-7-one (produced according to Allinger et al.; J. Org. Chem. 27, 722 (1962), regarding nomenclature see Ring Index 1960, page 239) are reduced to 6,7,8,9-tetrahydro-5H-benzocycloheptene-7-ol (M.P. 96–97°) by boiling with 2 g. of lithium aluminium hydride in 300 ml. of abs. ether for 4 hours. 13 g. of this alcohol are converted into 7 - bromo - 6,7,8,9-tetrahydro-5H-benzocycloheptene ($B.P._{15}$=153–156°) by treatment with 8.8 g. of phosphorous tribromide, first at −5° and then for 2 hours at 20° and 1 hour at 100°.

(b) 1 - (6',7',8',9' - tetrahydro - 5'H - benzocloheptene - 7' - yl) - 4 - phenyl - carboethoxy - piperidine is also obtained if 5.28 g. of 4-phenyl-4-carboethoxy-piperidine carbonate and 3.90 g. of 7-(p-toluene sulphonyloxy)-6,7,8,9-tetrahydro-5H-benzocycloheptene (M.P. 124–125°) are heated for 14 hours at 100°. M.P. 87–88°, methane sulphonate M.P. 205–206°.

The 7-(p-toluene sulphonyloxy)-6,7,8,9-tetrahydro-5H-benzocycloheptene is produced from 6,7,8,9-tetrahydro-5H-benzocycloheptene-7-ol by treatment with p-toluene sulphonyl chloride in the presence of pyridine.

EXAMPLE 13

(a) 7.9 g. of 4-phenyl-4-carboethoxy-piperidine carbonate are dissolved in 100 ml. of abs. benzene and the solution is refluxed until no more carbon dioxide is developed. The solvent is distilled off in vacuo and the 4-phenyl-4-carboethoxy-piperidine which remains and 4.4 g. of 2,3-epoxytetralin (produced according to Cook and Hill, J.A.C.S. 62, 1995 (1940)), are heated for 5 hours at 100°. After cooling, 500 ml. of ether are added to the reaction mixture and the whole is extracted several times with 100 ml. of 1 N hydrochloric acid. 1 N sodium hydroxide solution is added to the combined acid solutions and the precipitated salt until the reaction is alkaline and the mixture is extracted twice with ether. Non-reacted 4-phenyl-4-carboethoxy-piperidine is separated by the addition of solid carbon dioxide to the ether solution. After distilling off the solvent, 1-[3'-hydroxy-1',2',3',4'-tetrahydronaphthyl-(2')] - 4 - phenyl - 4 - carboethoxy-piperidine remains in the form of white crystals which, after recrystallisation from acetone/hexane, melt at 117–118°. Hydrochloride, M.P. 224–225°.

(b) 1-[3'-acetoxy-1',2',3',4'-tetrahydronaphthyl-(2')]-4-phenyl-4-carboethoxy-piperidine is obtained analogously to Example 1b starting from 5 g. of the above hydroxy base and a mixture of 10 ml. of abs. pyridine and 10 ml.

of acetanhydride, M.P. 82–83°. Hydrochloride, M.P. 185–186°.

(c) 1-[3'-propinoxy - 1',2',3',4' - tetrahydronaphthyl-(2')]-4-phenyl-4-carboethoxy-piperidine is obtained analogously to Example 1c starting from 2.9 g. of the above hydroxy base and 1.5 ml. of propionyl chloride, M.P. 98–99°. Hydrochloride, M.P. 190–195°.

EXAMPLE 14

(a) 1-[3'-hydroxy-8'-methyl-1',2',3',4'-tetrahydronaphthyl-(2')]-4-phenyl-4-carboethoxy-piperidine is obtained analogously to Example 13a starting from 8.2 g. of 4-phenyl-4-carboethoxy-piperidine and 5 g. of 5-methyl-2,3-epoxytetralin (for production see below); M.P. 150°. Hydrochloride M.P. 243–245°.

5-methyl-2,3-epoxytetralin is obtained from 1,4-dihydro-5-methyl-naphthalene (produced according to Hückel and Vevera, Ber. 95, 350 (1962)), with perbenzoic acid in chloroform solution, M.P. 90°.

(b) 1-[3'-acetoxy-8'-methyl-1',2',3',4'-tetrahydronaphthyl-(2')]-4-phenyl-4-carboethoxypiperidine is obtained analogously to Example 1b starting from 2 g. of the above hydroxy base and a mixtureof 10 ml. of abs. pyridine and 10 ml. of acetanhydride, M.P. 120°, hydrochloride M.P. 200–204°.

EXAMPLE 15

1-[1',4' - diethyl-3'-hydroxy-1',2',3',4'-tetrahydronaphthyl-(2')]-4-phenyl-4-carboethoxypiperidine is obtained analogously to Example 13a starting from 13.2 g. of 4-phenyl-4-carboethoxy-piperidine carbonate and 10.1 g. of 1,4-diethyl-2,3-epoxytetralin (for production thereof see below); B.P.$_{0.04}$ 168–175°.

Preparation of 1,4-diethyl-2,3-epoxytetralin: 1,4-diethyl-1,4-dihydronaphthalene is obtained according to Hückel and Jennewein, Chem. Ber. 95, 350 (1962) from naphthalene with sodium and ethyl iodide in liquid ammonia; B.P.$_{0.1}$ 70–75°. 1,4-diethyl-2,3-epoxytetralin is formed therefrom by the action of benzoic peracid in chloroform according to Cook and Hill, J. Am. Chem. Soc. 62, 1995, (1940); B.P.$_{11}$ 147–154°.

EXAMPLE 16

43.5 g. of 4-phenyl-4-carboethoxy-piperidine carbonate are dissolved in 200 ml. of benzene and the solution is heated in a vessel fitted with a water separator until no more carbon dioxide is developed and until the slight amount of water still in the solution has been removed. 24 g. of tetralone-(2) are then added and the reaction mixture is heated for 12 hours in the water separator under an atmosphere of nitrogen. The solution is then concentrated in vacuo and the residue, 1-[3',4'-dihydronaphthyl-(2')]-4-phenyl-4-carboethoxy-piperidine, is recrystallised from ethanol. M.P. 103–104° with decomposition.

1-[indenyl-(2')]-4-phenyl-4-carboethoxy-piperidine can be produced in an analogous manner from indanone-(2) and 4-phenyl-4-carboethoxy-piperidine carbonate. After recrystallising twice from benzene/petroleum ether it melts at 140–142°.

EXAMPLE 17

10.85 g. of 1-[3',4'-dihydronaphthyl-(2')]-4-phenyl-4-carboethoxy-piperidine (see Example 16) are dissolved by warming in 100 ml. of diethylene glycol dimethyl ether and the solution is added dropwise to 4.5 g. of sodium borhydride dissolved in 100 ml. of diethylene glycol dimethyl ether. The reaction mixture is then stirred for 2 hours at 45° and subsequently at room temperature. The somewhat turbid solution is then diluted with 700 ml. of ether and repeatedly extracted with dilute hydrochloric acid. The combined hydrochloric acid extracts are made alkaline at 0° with concentrated sodium hydroxide solution and exhaustively extracted with ether. After drying the ether with sodium sulphate and evaporating, 1-[1',2',3',4'-tetrahydronaphthyl-(2')] - 4 - phenyl-4-carboethoxy-piperidine is obtained which, after recrystallising twice from methanol, melts at 97–98°. Hydrochloride melting point 199–200°, methanol sulphonate M.P. 194–196°, see Examples 9 and 30.

1-[indanyl-(2')]-4-phenyl-4-carboethoxy-piperidine can be produced in an analogous manner from 1-[indenyl-(2')]-4-phenyl-4-carboethoxy-piperidine. M.P. 127–128°, hydrochloride M.P. 235–237°.

EXAMPLE 18

6.1 g. of 4-phenyl-4-carboethoxy-piperidine carbonate and 3.7 g. of 1-methyl-tetralone-(2) (B.P.$_{0.05}$ 93°, see J. Am. Chem. Soc. 76, 2029 (1954)) are dissolved in 100 ml. of toluene and the solution is boiled in a flask fitted with a water separator for 14 hours under an atmosphere of nitrogen. The solution is then evaporated in vacuo, the residue is dissolved in 100 ml. of ether and non-reacted 4-phenyl-4-carboethoxy-piperidine is precipitated from this solution in the form of the carbonate and is filtered off. 0.48 ml. of anhydrous formic acid are added to the 1-[1' - methyl - 3',4' - dihydronaphthyl-(2')]-4-phenyl-4-carboethoxy-piperidine (4.7 g.) obtained from the ethereal filtrate by distilling off the solvent and the whole is heated for 2 hours at 140°. 100 ml. of dilute sulphuric acid are then added to the reaction mixture and the whole is extracted with ether. The acid solution is made alkaline at 0° with concentrated sodium hydroxide solution and exhaustively extracted with ether. After drying the ether and evaporating, 1-[1'-methyl-1',2',3',4'-tetrahydronaphthyl-(2')]-4-phenyl-4-carboethoxy-piperidine is obtained. After recrystallisation from methanol it melts at 97–99°. Sulphate M.P. 190–195°.

The following compounds can be produced in an analogous manner from 4-phenyl-4-carboethoxy-piperidine carbonate: 1-[1' - ethyl - 1',2',3',4' - tetrahydronaphthyl-(2')]-4-phenyl-4-carboethoxy-piperidine (using 1-ethyl-tetralone-(2), B.P.$_{12}$ 140–145°), M.P. 81–82°; hydrochloride M.P. 182–184°; 1-[1'-n-propyl - 1',2',3',4'-tetrahydronaphthyl-(2')]-4-phenyl - 4 - carboethoxy - piperidine (using 1-n-propyl-tetralone-(2), B.P.$_{12}$ 143–151°), M.P. 111–112°; hydrobromide, M.P. 205–206°; 1-[1'-ethyl-indanyl-(2')] - 4 - phenyl-4-carboethoxy-piperidine (using 1-ethyl-indanone-(2), B.P.$_{12}$ 125–130°), M.P. 79–80°; sulphate M.P. 176–178°; 1-[1'-n-propyl-indanyl-(2')]-4-phenyl-4-carboethoxy-piperidine (using 1-n-propyl-indanone-(2), B.P.$_{12}$ 146–155°), M.P. 104–105°; methane sulphonate M.P. 151–152°; 1-[6'-methoxy-1',2',3',4'-tetrahydronaphthyl-(2')] - 4 - phenyl-4-carboethoxy-piperidine (using 6-methoxy-tetralone-(2) prepared according to Nelson, J. Am. Chem. Soc. 82, 2575 (1960)), B.P.$_{0.01}$ 130–140°; and 1-[6'-methyl-1',2',3',4'-tetrahydronaphthyl-(2')] - 4 - phenyl - 4 - carboethoxy-piperidine (using 6-methyl-tetralone-(2)), B.P.$_{0.006}$ 120–130°; hydrochloride M.P. 210°; sulphate M.P. 223°.

EXAMPLE 19

2.64 g. of 4-phenyl-4-carboethoxy-piperidine carbonate and 2.92 g. of tetralone-(1) are dissolved in 5 ml. of toluene and the solution is heated in a flask fitted with a water separator under an atmosphere of nitrogen in an oil bath of 180°–200°. After evaporating and recrystallising from ethanol/ether, the 1-[3',4'-dihydronaphthyl-(1')]-4-phenyl-4-carboethoxy-piperidine so obtained melts at 85.5–87.5°.

The 1 - [1',2',3',4' - tetrahydronaphthyl-(1')]-4-phenyl-4-carboethoxy-piperidine is obtained analogously to Example 18 from 1-[3',4'-dihydronaphthyl-(1')]-4-phenyl-4-carboethoxy-piperidine by treatment with anhydrous formic acid. Hydrobromide M.P. 186–187°.

2.64 g. of 4-phenyl-4-carboethoxy-piperidine carbonate and 3.20 g. of 7-methyl-tetralone-(1) are condensed in an analogous manner (the latter is produced according to Barnett, J. Chem. Soc. 1933, 434). The oily 1-[7'-methyl-3',4'-dihydronaphthyl-(1')]-4-phenyl - 4 - carboethoxy-piperidine (2.93 g.) so obtained and 0.45 g. of anhydrous formic acid are kept for 2 hours at 140°. The 1-[7' - methyl - 1',2',3',4' - tetrahydronaphthyl-(1')]-4-phenyl-4-carboethoxy-piperidine so formed is distilled at $10^{-3}$ mm. pressure, B.P. 200–210°; M.P. 104–105°, hydrobromide M.P. 145°.

The following compounds are produced in an analogous manner: from 7-isopropyl-tetralone-(1) (produced according to Barnett, J. Chem. Soc. 1933, 434), 1-[7'-isopropyl - 1',2',3',4' - tetrahydronaphthyl - (1')]-4-phenyl-4-carboethoxy-piperidine, M.P. 118–119°, hydrobromide M.P. 149°, nitrate M.P. 179–180° (with decomposition): from 4,7-dimethyl-tetralone-(1) (produced according to Phillips, J. Am. Chem. Soc. 77, 3658 (1955)), 1-[4',7'-dimethyl - 1',2',3',4' - tetrahydronaphthyl-(1')]-4-phenyl-4-carboethoxy-piperidine, nitrate M.P. 175–180° (with decomposition); from 5,6-dimethyl-tetralone-(1) (produced according to Barnett, J. Chem. Soc. 1933, 434), 1-[5',6'-dimethyl - 1',2',3',4' - tetrahydronaphthyl-(1')]-4-phenyl-4-carboethoxy-piperidine, M.P. 122°, nitrate M.P. 180; and from 6-chlorotetralone-(1) (produced according to Schroeter, Ber. 63, 1308 (1930) and 71, 1040 (1938)), 1-[6' - chloro - 1',2',3',4' - tetrahydronaphthyl-(1')]-4-phenyl - 4 - carboethoxy-piperidine, nitrate M.P. 185°.

EXAMPLE 20

47 g. of 1-[3',4'-dihydronaphthyl-(2')]-4-phenyl-4-carboethoxy-piperidine (see Example 16), 74 g. of methyl iodide and 130 ml. of anhydrous dioxan are refluxed for 14 hours under an atmosphere of nitrogen. The solvent is distilled off in vacuo, the immonium salt which remains is taken up in abs. ether and filtered off while excluding air. 54 g. of this immonium salt are dissolved in 350 ml. of diethylene glycol dimethyl ether and 27.8 g. of sodium borhydride, dissolved in 190 ml. of diethylene glycol dimethyl ether, are added dropwise to the solution. The reaction mixture is then stirred first for 3 hours at 45° and then for 14 hours at room temperature. The turbid solution is then carefully acidified with dilute sulphuric acid and extracted with ether. The acid solution is made alkaline at 0° with concentrated sodium hydroxide solution and exhaustively extracted with ether. After drying the ether and evaporating, 1-[1'-methyl-1',2',3',4'-tetrahydronaphthyl-(2')]-4-phenyl-4-carboethoxy-piperidine is obtained which, after recrystallising twice from methanol, melts at 97–99°. Sulphate M.P. 190–195°.

1-[1' - methyl-indanyl - (2')]-4-phenyl-4-carboethoxy-piperidine (M.P. 98–100°) is obtained from 1-[indenyl-(2')]-4-phenyl - 4 - carboethoxy-piperidine in analogous manner; hydrobromide M.P. 234–235°.

EXAMPLE 21

(a) 3.29 g. of 4-(4'-chlorophenyl)-4-carboethoxy-piperidine carbonate (hydrochloride M.P. 211°) (produced analogous to O. Eisleb, Ber. 74, 1443 (1941) from 4-chlorobenzyl cyanide and N,N-bis-(2-chloroethyl)-p-toluene sulphonamide) are dissolved in 50 ml. of toluene and the solution is boiled in a flask fitted with water separator until carbon dioxide is no longer developed and any slight amount of water still contained in the solution is removed. 1.46 g. of tetralone-(2) are then added and the reaction mixture is further heated in a flask fitted with water separator under an atmosphere of nitrogen. The solution is then evaporated in vacuo and the residue, 1-[3',4'-dihydronaphthyl-(2')] - 4 - (4''-chlorophenyl)-4-carboethoxy-piperidine melts at 145° when recrystallised from benzene/methanol. 1-[1'-methyl-3',4'-dihydronaphthyl-(2')]-4-(4'' - chlorophenyl)-4-carboethoxy-piperidine is obtained in an analogous manner starting from 3.29 g. of 4-(4'-chlorophenyl)-4-carboethoxy-piperidine carbonate and 1.60 g. of 1-methyl-tetralone-(2) (produced analogous to G. Stork, J. Am. Chem. Soc. 76, 2029 (1954)). M.P. 117°.

(b) 1-[1',2',3',4'-tetrahydronaphthyl - (2')] - 4 - (4''-chlorophenyl)-4-carboethoxy-piperidine is obtained analogously to Example 18 starting from 3.95 g. of 1-[3',4'-dihydronaphthyl-(2')]-4-(4'' - chlorophenyl) - 4 - carboethoxy-piperidine and 0.52 g. of anhydrous formic acid. Hydrochloride M.P. 222°. 1-[1'-methyl-1',2',3',4'-tetrahydronaphthyl-(2')] - 4 - (4''-chlorophenyl) - 4 - carboethoxy-piperidine can be produced in analogous manner from 1-[1'-methyl-3',4'-dihydronaphthyl-(2')] - 4 - (4''-chlorophenyl) - 4 - carboethoxy-piperidine. Hydrochloride M.P. 208°.

EXAMPLE 22

2.46 g. of 4-(2'-tolyl)-4-carboethoxy-piperidine (M.P. 168°) (produced analogously to O. Eisleb, Ber. 74, 1443 (1941)) from o-tolyl-acetonitrile and N,N-bis-(2'-chloroethyl)-p-toluene sulphonamide) are dissolved in 50 ml. of toluene and, with 1.46 g. of tetralone-(2) boiled for 12 hours in a flask fitted with water separator. The solution is then evaporated in vacuo and the residue, 1-[3'-4'-dihydronaphthyl-(2')]-4-(o-tolyl)-4-carboethoxyl - piperidine, is reduced analogously to Example 18 with 0.51 g. of anhydrous formic acid. The 1-[1',2',3',4'-tetrahydronaphthyl-(2')]-4-(o-tolyl)-4-carboethoxy - piperidine so obtained produces a hydrochloride which melts at 305° (with decomposition).

EXAMPLE 23

1-[1',2',3',4'-tetrahydronaphthyl-(2')]-4-(3'' - methoxyphenyl)-4-carboethoxy-piperidine, hydrochloride M.P. 191°, is obtained analogously to Example 22 by condensing 2.63 g. of 4-(3'-methoxyphenyl)-4-carboethoxy-piperidine (hydrochloride M.P. 160°) (produced analogously to O. Eisleb, Ber. 74, 1443 (1941)) from 3-methoxybenzyl nitrile and N,N-bis-(2-chloroethyl -p-toluene sulphonamide) with 1.46 g. of tetralone-(2) and then reducing with formic acid.

EXAMPLE 24

607 mg. of 1-[1'-oxo-1',2',3',4'-tetrahydropaphthyl-(2')]-4-phenyl-4-carboethoxy-piperidine (see Example 10) are dissolved in 10 ml. of diethylene glycol dimethyl ether and a solution of 400 mg. of sodium borhydride in 10 ml. of diethyl glycol dimethyl ether is slowly added. The reaction mixture is stirred for 3 hours at 35° and 14 hours at room temperature and the product is then worked up as described in Example 20. 1-[1'-hydroxy-1',2',3',4'-tetrahydronaphthyl - (2')-4-phenyl-4-carboethoxypiperidine is obtained. After recrystallisation from methylene chloride/pentane, M.P. 153–154°. Methane sulphonate M.P. 151–152°.

EXAMPLE 25

760 mg. of 1-[2'-hydroxy-1',2',3',4'-tetrahydronaphthyl-(1')]-4-phenyl-4-carboethoxy-piperidine (see Example 1) are dissolved in a mixture of 80 ml. of ether and 30 ml. of methylene chloride, 282 mg. of bortrifluoride/etherate complex and a solution of 1 g. of diazomethane in 45 ml. of ether are added at 0° and the whole left to stand for half an hour. The reaction mixture is diluted with 200 ml. of ether and washed with 10% sodium carbonate solution and water. After drying and evaporating the ether solution, an oily residue is obtained which is dissolved in hexane and filtered according to Brockmann through 10 times the amount of aluminum oxide activity II. After distilling off the solvent, 1-[2'-methoxy-1',2',3',4' tetrahydronaphthyl-(1')]-4-phenyl-4-carboethoxy - piperidine remains. After recrystallisation twice from pentane it melts at 54–55°.

EXAMPLE 26

200 ml. of 1-[6'-amino-1',2',3',4'-tetrahydronaphthyl-(1')]-4-pheny-4-carboethoxy-piperidine (see Example 33) are dissolved in 5 ml. of acetanhydride and the solution is heated for 1 hour at 100°. The mixture is evaporated to dryness in vacuo, the residue is dissolved in ether and the solution is washed with diluted sodium hydroxide solution and water. After drying and evaporating, 1-[6'- acetylamino-1',2',3',4'-tetrahydronaphthyl- (1')]-4-phenyl-4-carboethoxy-piperidine is obtained. On recrystallising twice from ether/pentane, it melts at 123–124°.

EXAMPLE 27

200 mg. of 1-[6'-acetylamino - 1',2',3',4' - tetrahydronaphthyl-(1')]-4-phenyl-4-carboethoxy-piperidine (see Example 26) are dissolved in 20 ml. of 6 N hydrochloric acid. The solution is heated for 2 hours at 100°, the mixture is made alkaline at 0° with dilute sodium hydroxide solution and extracted exhaustively with ether. After drying and evaporating the ether solution, 1-[6'-amino-1',2',3,'4'-tetrahydronaphthyl - (1')]-4-phenyl-4-carboethoxy-piperidine is obtained. On recrystallisation from ether it melts at 128–129°; dihydrochloride M.P. 196–203°.

EXAMPLE 28

500 mg. of a suspension of 50% sodium hydride in paraffin oil is dissolved in 50 ml. of abs. benzene and a solution of 38 g. of 1-[3'-hydroxy-1',2',3',4'-tetrahydronaphthyl-(2')-4-phenyl-4-carboethoxy-piperidine (see Example 13) in 50 ml. of abs. benzene is added. 1.15 g. of methane sulphonyl chloride dissolved in 50 ml. of abs. benzene is then added dropwise and the reaction mixture is stirred for 14 hours at room temperature. The solvent is then distilled off in vacuo, 100 ml. of ether are added to the residue and the insoluble precipitate is filtered off. On distilling off the solvent from the ethereal filtrate, 1-[3'-chloro-1',2',3',4'-tetrahydronaphthyl-2')] - 4 - phenyl-4-carboethoxy-piperidine is obtained. On crystallising twice from chloroform/ether, it melts at 125–126°.

EXAMPLE 29

1.15 g. of 1 - [3' - chloro-1',2',3',4'-tetrahydronaphthyl-('2)]-4-phenyl - 4 - carboethoxy - piperidine are dissolved in 100 ml. methanol, 15 ml. of a methanolic sodium methylate solution (from 900 mg. of sodium and 100 ml. of methanol) are added dropwise and the reaction mixture is refluxed for 1 hour. 200 ml. of ice water are added to the solution and the whole is extracted several times with ether. The ether extracts are washed neutral with water and dried. On distilling off the solvent, 1-[1',2'-dihydronaphthyl-(2')]-4 - phenyl-4-carboethoxy-piperidine is obtained. M.P. on recrystallisation from hexane 123–124°. Methane sulphonate M.P. 162–163°.

EXAMPLE 30

361 mg. of 1-[1',2'-dihydronaphthyl-(2')]-4-phenyl-4-carboethoxy-piperidine are dissolved in 200 ml. of ethanol and the solution is shaken at room temperature, in the presence of 50 mg. of platinum catalyst, under an atmosphere of hydrogen (according to Adams). The reaction ceases after 1 mol of hydrogen gas has been taken up. The catalyst is then filtered off and 1-[1',2',3',4'-tetrahydronaphthyl-(2')] - 4-phenyl-4-carboethoxy-piperidine is obtained from the filtrate by distilling off the solvent. Recrystallised from hexane, it melts at 97–98°; hydrochloride M.P. 199–200°; methane sulphonate M.P. 194–196° (see Examples 9 and 17).

EXAMPLE 31

(a) 379 mg. of 1-[2'-hydroxy-1',2',3',4'-tetrahydronaphthyl-(1')]-4-phenyl - 4 - carboethoxy-piperdine are dissolved in 40 ml. of glacial acetic acid, a solution of 1 g. of chromium trioxide in 20 ml. of glacial acetic acid is added and the reaction mixture is left to stand for 14 hours at room temperature. After the excess chromium trioxide has been reduced with 5 ml. of methanol, the acetic acid is distilled off in vacuo, 20 ml. of water are added to the residue and this is made alkaline with concentrated sodium hydroxide solution and exhaustively extracted with ether. The ether extract is washed neutral with water, dried and concentrated, whereupon 1-[2'-oxo-1',2',3',4'-tetrahydronaphthyl - (1')] - 4 - phenyl-4-carboethoxy-piperidine is obtained as an oil.

(b) 379 mg. of 1-[2' - hydroxy-1',2',3',4'-tetrahydronaphthyl-(1')]-4-phenyl - 4 - carboethoxy-piperidine are dissolved in 5 ml. of abs. pyridine, the chromium trioxide/pyridine complex (from 300 mg. of chromium trioxide and 3 ml. of pyridine) is added and the reaction mixture is left to stand for 14 hours at room temperature. It is then poured in water, exhaustively extracted with ether and the ether extract is washed neutral with water. The 1[2'-oxo-1'2',3',4'-tetrahydronaphthyl-(1')] - 4 - phenyl-4-carboethoxy-piperidine is obtained in this way as an oil.

EXAMPLE 32

2.64 g. of 4-phenyl-4-carboethoxy - piperidine carbonate and 1.34 g. of 1-acetoxy-2-bromotetralin (produced according to Braun and Kirschbaum, Ber. 54, 597 (1921)) are heated for 14 hours at 100°. The reaction mixture is then dissolved in ether and 1 N hydrochloric acid and extracted several times with 20 ml. of 1 N hydrochloric acid. The combined acid solutions are then made alkaline with ice cold 1 N sodium hydroxide solution and extracted with ether. Non-reacted 4 - phenyl-4-carboethoxy-piperidine is precipitated from the ether extract as carbonate and is filtered off. On distilling off the solvent from the ethereal filtrate the 1-[2' - hydroxy-1',2',3',4' - tetrahydronaphthyl-(1')] - 4 - phenyl-4-carboethoxy-piperidine which has been formed by rearrangement and splitting off the acetyl radical, is obtained as an oil. Hydrobromide M.P. 112–115° (see Example 1).

EXAMPLE 33

2.64 g. of 4-phenyl-4-carboethoxy-piperidine carbonate and 3.78 g. of 6-acetylamino-tetralone-(1), (produced according to Allinger, J. Org. Chem. 27, 70, (1962)), are dissolved in 5 ml. of toluene and the solution is heated in a vessel fitted with a water separator for 4 hours under an atmosphere of nitrogen in an oil bath of 160°. After cooling, 0.5 g. of anhydrous formic acid are added to the oily crude product and the whole is kept for 2 hours in an oil bath of 140°. The reaction mixture is taken up in ether and extracted with 2 N hydrochloric acid. The acid solution is made alkaline at 0° with concentrated sodium hydroxide solution and extracted with ether. The ether solution is dried, any 4 - phenyl-4-carboethoxy-piperidine still present is precipitated, by the addition of Dry Ice, in the form of the carbonate and is filtered off. The filtrate is evaporated and the 1-[6'-amino-1',2',3',4'-tetrahydronaphthyl-(1')] - 4 - phenyl - 4 - carboethoxy-piperidine which remains as an oil is converted into the dihydrochloride by treatment with hydrogen chloride solution. M.P. 196–203°. The acetyl group in the starting material is split off during the reaction.

EXAMPLE 34

5.28 g. 4 - phenyl-4-carboethoxy-piperidine carbonate are refluxed with 50 ml. of absolute benzene until a solution of the base is obtained, freeing carbon dioxide. After cooling, a solution of 2.56 g. 1-bromo-7-nitrotetralin (preparation see below) in 20 ml. of absolute benzene is added and left standing over night. The filtered solution from the precipitated 4-phenyl-4-carboethoxy-piperidine hydrobromide is extracted three times, using 50 ml. of 2 N hydrochloric acid each time. The combined extracts are then made alkaline with concentrated sodium hydroxide solution and extracted several times with 100 ml. of ether each time. The basic starting material which is still present is precipitated with solid carbon dioxide and filtered off.

The neutrally washed solution is dried with sodium sulphate and the residue is dissolved and recrystallized from ether/petroleum ether.

The 1 - [7'-nitro-1',2',3',4'-tetrahydro-naphthyl-(1')]-4 - phenyl-4-carboethoxy-piperidine melts at 115–118°. From methanol solutions of the base and equimolar amounts of various acids the following crystallizing salts are obtained when ether is added:

| | Melting Point° |
|---|---|
| Nitrate | 180–185 |
| Hydrobromide | 137–140 |
| Tartrate | 180–181 |
| Phosphate | 177–180 |
| Methanesulphonate | 210–215 |
| Sulphate | 160–163 |

1-bromo-7-nitro-tetralin is prepared as follows: 800 ml. of sodium borhydride in 20 ml. of methanol are added to a solution of 4 g. of 7-nitro-tetralone-1 (prepared according to V. Braun, Liebigs Ann. Chem. 451, 40 (1927)) in 100 ml. of methanol. The combined solutions are left standing over night. After adding 1 liter of water the solution is slightly acidified (pH 4–5) with hydrochloric acid and then exhaustively extracted with ether. The ether solution is washed neutral, dried with sodium sulphate and evaporated. Melting point of 7-nitro-tetralol-1 106–107°. 2 g. of 7-nitro-tetralol-1 are dissolved in 50 ml. of absolute ether and cooled to −10°. While stirring, a solution of 1 ml. of phosphorus tribromide in 10 ml. of absolute ether is slowly added dropwise so that the temperature does not rise above 0°. Then the mixture is slowly warmed to room temperature stirring for another two hours. The solution is poured on ice and the ether phase is washed neutral, dried with sodium sulphate and evaporated. M.P. of 1-bromo-7-nitro-tetralin, 70°.

EXAMPLE 35

5 g. 1-[7'-nitro-1',2',3',4'-tetrahydro-naphthyl-(1')]-4-phenyl-4-carboethoxy-piperidine are dissolved in 50 ml. of ethanol and the solution is warmed in a water bath. To this solution are added 2 ml. of hydrazine hydrate and about 500 ml. Raney nickel in an ethanol suspension. After the solution has become colorless (about 10 minutes) the satalyst is filtered off. The solution is poured into ten times the amount of water and exhaustively extracted with ether. The ether phases are washed neutral, dried with sodium sulphate and evaporated.

The resulting 1-[7'-amino-1',2',3',4'-tetrahydro-(1')]-4-phenyl-4-carboethoxy-piperidine crystallizes from ether/petroleum ether. M.P. 107–109°.

M.P. dinitrate (dec.) 210°–215° (from methanol/ether).

EXAMPLE 36

1-[6'-fluoro-1',2',3',4'-tetrahydronaphthyl - (1')] - 4-phenyl-4-carbethoxy-piperidine is prepared analogously to Example 34 starting with 5.28 g. 4-phenyl-4-carboethoxy-piperidine carbonate and 2.29 g. 1-bromo-6-fluoro-tetralin.

Nitrate, M.P. 180–181° and sulphate, M.P. 195–200° from methanol/ether.

The 1-bromo-6-fluoro-tetralin which is used to prepared analogously to the 1-bromo-7-nitro-tetralin described in Example 34, starting with 6-fluoro-tetralone-1 (according to Allinger, J. Org. Chem. 27, 70 (1962)).

EXAMPLE 37

1-[6'-fluoro-1',2',3',4'-tetrahydro-naphthyl-(1')]-4 - (4'-chloro-phenyl)-4 - carboethoxy - piperidine is prepared analogously to Example 21 starting with 5.98 4-(4'-chlorophenyl)-4-carboethoxy-piperidine carbonate and 2.29 g. 1-bromo-6-fluorotetraline.

Nitrate, M.P. 160–163° and sulphate, M. P. 210–212° from methanol/ether.

EXAMPLE 38

2 g. 1-[7'-amino-1',2',3',4'-tetrahydro - naphthyl] - 4-phenyl-4-carboethoxy-piperidine are dissolved in 30 ml. of formic acid. 2 ml. of 30% formaldehyde solution are added and the solution is refluxed two hours. Then 2 ml. of concentrated hydrochloric acid are added and most of the formic acid is evaporated off in vacuo. The mixture is dissolved in 100 ml. water, made alkaline with concentrated sodium hydroxide solution and extracted three times, using 100 ml. ether each time. The combined ether phases are washed neutral, dried with sodium sulphate and evaporated. The residue is dissolved and recrystallized from ether/petroleum ether. The 1-[7'-dimethylamino-1',2',3',4'-tetrahydro-naphthyl]-4-phenyl-4-carboethoxy - piperidine so obtained melts at 95–105°.

What is claimed is:

1. A member selected from the group consisting of a compound of the Formula I

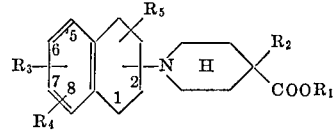

and a compound of the Formula II

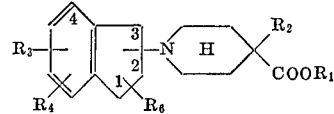

wherein $R_1$ is lower alkyl, $R_2$ is phenyl, lower alkylphenyl, lower alkoxyphenyl, chlorophenyl or bromophenyl, $R_3$ is hydrogen, hydroxy, chloro, bromo, fluoro, lower alkyl, lower alkoxy, lower alkanoyloxy, amino, lower alkyl-amino, lower alkanoylamino or nitro, $R_4$ is hydrogen or lower alkyl, $R_5$ is hydrogen, oxo, hydroxy, lower alkyl, lower alkoxy or lower alkanoyloxy, $R_6$ is hydrogen, hydroxy, lower alkyl, lower alkoxy or lower alkanoyloxy.

2. A compound according to claim 1 of Formula I wherein $R_1$ is lower alkyl, $R_2$ is phenyl, lower alkylphenyl, lower alkoxyphenyl, chlorophenyl or bromophenyl, $R_3$ is hydrogen, hydroxy, chloro, bromo, fluoro, lower alkyl, lower alkoxy, lower alkanoyloxy, amino, lower alkyl-amino, lower alkanoyl-amino or nitro, $R_4$ is hydrogen or lower alkyl, and $R_5$ is hydrogen, oxo, hydroxy, lower alkyl, lower alkoxy or lower alkanoylolxy.

3. A compound according to claim 1 of Formula II wherein $R_1$ is lower alkyl, $R_2$ is phenyl, lower alkylphenyl, lower alkoxyphenyl, chlorophenyl or bromophenyl, $R_3$ is hydrogen, hydroxy, chloro, bromo, fluoro, lower alkyl, lower alkoxy, lower alkanoyloxy, amino, lower alkyl-amino, lower alkanoyl-amino or nitro, $R_4$ is hydrogen or lower alkyl, and $R_6$ is lower alkoxy.

4. A compound according to claim 1 of Formula II wherein $R_1$ is lower alkyl, $R_2$ is phenyl, lower alkylphenyl, lower alkoxyphenyl, chlorophenyl or bromophenyl, $R_3$ and $R_4$ are hydrogen, $R_6$ is hydrogen, hydroxy, lower alkyl or lower alkanoyloxy.

5. A compound according to claim 1 which is 1-[1',2',3',4'-tetrahydronaphthyl-(2')]-4-phenyl - 4 - carboethoxy-piperidine.

6. A compound according to claim 1 which is 1-[3'-propionoxy-1',2',3',4'-tetrahydronaphthyl-(2')]-4 - phenyl 4-carbethoxy-piperidine.

7. A compound according to claim 1 which is 1-[3'-acetoxy-8'-methyl-1',2',3',4'-tetrahydronaphthyl-(2')] - 4-phenyl-4-carbethoxy-piperidine.

8. A compound according to claim 1 which is 1-[1'-methyl-1',2',3',4'-tetrahydronaphthyl-(2')]-4 - phenyl - 4-carbethoxy-piperidine.

9. A compound according to claim 1 which is 1-[6'-methyl-1',2',3',4'-tetrahydronaphthyl-(2')]-4-phenyl - 4-carbethoxy-piperidine.

10. A compound according to claim 1 which is 1-[1',2',3,'4'-tetrahydronaphthyl-(2')]-4-(4' - chlorophenyl) - 4-carethoxy-piperidine.

11. A compound according to claim 1 which is 1-(1'-ethoxy-indanyl-(2')]-4-phenyl-4-carbethoxy-piperidine.

12. A compound according to claim 1 which is 1-[indanyl-(2')]-4-phenyl-4-carbethoxy-piperidine.

13. A compound according to claim 1 which is 1-[1'-ethyl-indanyl-(2')]-4-phenyl-4-carbethoxy-piperidine.

14. A compound according to claim 1 which is 1-[2'-acetoxy-indanyl-(1')]-4-phenyl-4-carbethoxy-piperidine.

15. A compound according to claim 1 which is 1-[2'-propionoxy-indanyl-(1')]-4-phenyl-4-carbethoxy - piperidine.

16. A compound according to claim 1 which is 1-[1'-propoxy-indanyl-(2')]-4-phenyl-4-carbethoxy-piperidine.

17. A pharmaceutically acceptable acid addition salt of a compound according to claim 1.

References Cited

UNITED STATES PATENTS 2,982,783   5/1961   Schenck et al. _____ 260—571

OTHER REFERENCES

Broenden et al., Synthetic Substances With Moophine Like Effect—Bulletin World Health Organization (1955) 13, pp. 937–998 (pertinent pages 956–964).

HENRY R. JILES, Primary Examiner

G. THOMAS TODD, Assistant Examiner

U.S. Cl. X.R.

260—294, 294.3, 348, 470, 590, 618, 999